(12) United States Patent
Martinez Tarradell et al.

(10) Patent No.: US 10,708,973 B2
(45) Date of Patent: Jul. 7, 2020

(54) CELLULAR INTERNET OF THINGS (CIOT) OPTIMIZATIONS FOR NARROWBAND (NB) AND NON-NB IOT NETWORKS

(71) Applicant: Intel Corporation, Santa Clara, CA (US)

(72) Inventors: Marta Martinez Tarradell, Hillsboro, OR (US); Puneet Jain, Hillsboro, OR (US); Richard Burbidge, Shrivenham (GB); Sangeetha Bangolae, Houston, TX (US); Sudeep Palat, Cheltenham (GB); Seau Lim, Swindon (GB); Youn Hyoung Heo, Seoul (KR)

( * ) Notice: Subject to any disclaimer, the term of this patent is extended or adjusted under 35 U.S.C. 154(b) by 0 days.

(21) Appl. No.: 16/064,181

(22) PCT Filed: Dec. 28, 2016

(86) PCT No.: PCT/US2016/068986
§ 371 (c)(1),
(2) Date: Jun. 20, 2018

(87) PCT Pub. No.: WO2017/123417
PCT Pub. Date: Jul. 20, 2017

(65) Prior Publication Data
US 2018/0376531 A1    Dec. 27, 2018

Related U.S. Application Data

(60) Provisional application No. 62/277,881, filed on Jan. 12, 2016.

(51) Int. Cl.
*H04W 76/27* (2018.01)
*H04W 76/10* (2018.01)
(Continued)

(52) U.S. Cl.
CPC ....... *H04W 76/27* (2018.02); *H04W 36/0022* (2013.01); *H04W 74/0833* (2013.01); *H04W 76/10* (2018.02)

(58) Field of Classification Search
CPC ............. H04W 76/27; H04W 74/0833; H04W 36/0022; H04W 76/10
See application file for complete search history.

(56) References Cited

U.S. PATENT DOCUMENTS

2018/0352416 A1* 12/2018 Ryu ..................... H04W 4/70

FOREIGN PATENT DOCUMENTS

EP    2624656 A1    8/2013
EP    2911443 A1    8/2015

OTHER PUBLICATIONS

3GPP TSG-RAN WG2 Meeting #92 (R2-157187); Running 36.300 CR to capture agreements on NB-IoT; Annaheim, U.S.A.; Nov. 16-20, 2015.
(Continued)

*Primary Examiner* — Walter J Divito

(57) ABSTRACT

Technology for an eNodeB operable to support Cellular Internet of Things (CIoT) is disclosed. The eNodeB can generate a system information block (SIB) that includes one or more indicators that one or more CIoT Evolved Packet System (EPS) optimizations are supported at the eNodeB. The eNodeB can encode, at the eNodeB, the SIB for transmission to a user equipment (UE) to enable the eNodeB to receive a request from the UE for a use of the CIoT EPS optimizations. The eNodeB can decode a radio resource control (RRC) connection setup complete message received from the UE. The RRC connection setup complete message can include one or more indicators that one or more CIoT EPS optimizations are supported at the UE.

21 Claims, 7 Drawing Sheets

(51) Int. Cl.
*H04W 36/00* (2009.01)
*H04W 74/08* (2009.01)

(56) References Cited

OTHER PUBLICATIONS

3GPP TSG RAN WG2 NB-IOT Ad-hoc Meeting (R2-160402); LS on S1 signalling solutions for non-NB-IoT UEs; Budapest, Hungary; Jan. 19-21, 2016.
3GPP SA WG2 Meeting #112 (S2-154394); Introduction of support for NB-IoT; Anaheim, U.S.A.; Nov. 16-20, 2015.
3GPP TSG SA WG2 Meeting #112 (S2-154395); Introducing CIoT Optimisations; Anaheim, U.S.A.; Nov. 16-20, 2015.
3GPP TSG-SA WG2 Meeting #112 (S2-154400); Introduction of non-IP data delivery via the SCEF for cellular IoT; Anaheim, U.S.A.; Nov. 16-20, 2015.
3GPP TSG SA WG2 Meeting #112 (S2-154451); Introduction of Control Plane CIoT EPS optimization; Anaheim, U.S.A.; Nov. 16-20, 2015.
3GPP TSG SA WG2 Meeting #112 (S2-154452); Introduction of attach procedure changes for CIoT EPS optimization; Anaheim, U.S.A.; Nov. 16-20, 2015.
3GPP TSG-SA WG2 Meeting #112 (S2-154453); Introduction of solution 18—suspend and resume procedure; Anaheim, U.S.A.; Nov. 16-20, 2015.
3GPP SA WG2 Meeting #112 (S2-154454); Introducing support for Non-IP data for CIoT; Anaheim, U.S.A.; Nov. 16-20, 2015.
3GPP TS 23.401, V13.5.0; General Packet Radio Service (GPRS) enhancements for Evolved Universal Terrestrial Radio Access Network (E-UTRAN) access (Release 13); Dec. 2015.
3GPP TSG-RAN WG3 Ad Hoc NB-IoT (R3-160079); Impact of CIoT Optimisations on S1AP Common Procedures; Budapest, Hungary; Jan. 20-22, 2016.
3GPP TSG-CT WG1 Meeting #95bis (C1-160105); Support of Control Plane CIoT EPS optimization; Nashville (TN), U.S.A.; Jan. 11-15, 2016.
3GPP TSG-RAN WG2 #91bis (R2-154878); RRC Connection Control in NB-IOT; Malmo, Sweden; Oct. 5-9, 2015.
3GPP TS 24.301; V14.0.1; Non-Access Stratum (NAS) protocol for Evolved Packet System (EPS); Stage 3; (Release 14); Jun. 2016.
3GPP TR 23.720; V1.1.0; Architecture enhancements for Cellular Internet of Things (Release 13); Oct. 2015).
3GPP TR 45.820; V13.1.0; Cellular system support for ultra-low complexity and low throughput Internet of Things (CIoT) (Release 13); Nov. 2015.
3GPP TSG RAN Meeting #69 (RP-151621); New Work Item: Narrowband IOT (NB-IOT); Phoenix (AZ), U.S.A.; Sep. 14-16, 2015.

* cited by examiner

| Option | Normal data reporting | Exception data reporting |
|---|---|---|
| a | delayTolerantAccess | mo-Data |
| b | mo-Data | emergency |
| c | mo-Data | highPriority |
| d | mo-Data | Mo-VoiceCall |

CELLULAR INTERNET OF THINGS (CIOT) OPTIMIZATIONS FOR NARROWBAND (NB) AND NON-NB IOT NETWORKS

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 13 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 illustrates a table of establishment causes that are applicable to narrowband Internet of Things (NB-IoT) networks and non-NB IoT networks in accordance with an example;

Figure 1:
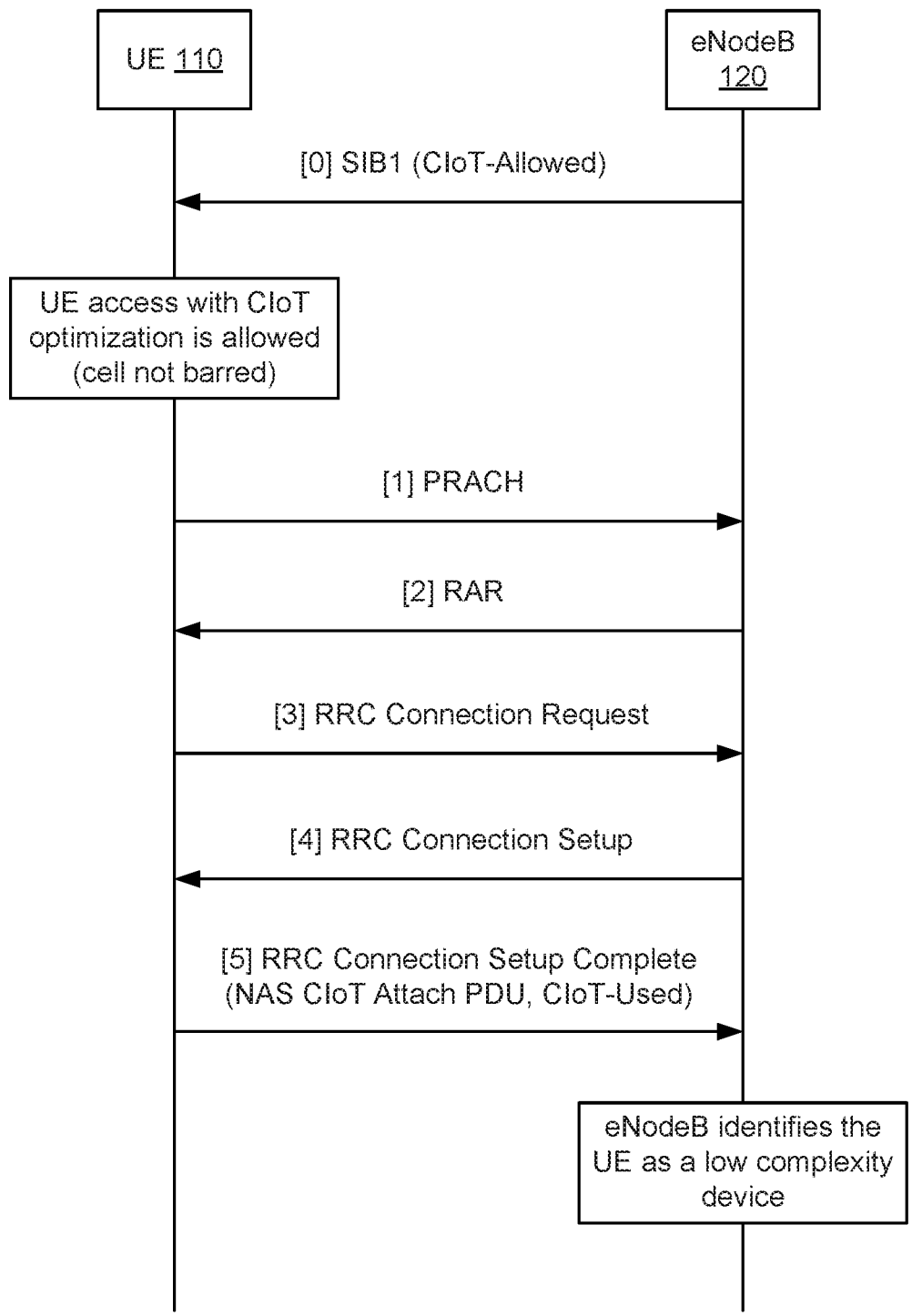
FIG. 1 illustrates signaling between an eNodeB and a user equipment (UE) to indicate that at least one of the eNodeB and the UE support a cellular Internet of Things (CIoT) optimization in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Narrow band Internet of Things (NB-IoT) is a technology standardized by the Third Generation Partnership Project (3GPP). NB-IoT has been designed to address specific cellular IoT (CIoT) constraints, such that NB-IoT can provide improved indoor coverage, support for a relatively large number of low throughput devices, low delay sensitivity, low device cost, low device power consumption and an improved network architecture. NB-IoT can be deployed in either the Global System for Mobile Communications (GSM) spectrum or the Long Term Evolution (LTE) spectrum. NB-IoT can also be deployed in Fifth Generation (5G) or New Radio (NR) technologies.

In one example, NB-IoT can support radio resource control (RRC) procedures based on existing LTE protocols and relevant optimizations to enable a selected physical layer. In addition, a control plane (CP) solution for data over non-access stratum (NAS) can be a mandatory feature for a NB-IoT UE and eNodeB (and the CP solution can be optional for a non-NB IoT UE), while a user plane (UP) solution that involves storing UE access stratum (AS) context in the eNodeB can be an optional feature. In the UP solution, the UE AS context can be stored on the UE for idle mode/procedures. The CP solution can be considered a CP CIoT evolved packet system (EPS) optimization, and the UP solution can be considered a UP CIoT EPS optimization. The CP CIoT EPS optimization can enable support of an efficient transport of user data (e.g., Internet Protocol (IP) data or non-IP data) or short messaging service (SMS) messages over the control plane via a mobility management entity (MME) without necessitating an establishment of a data radio bearer. The UP CIoT EPS optimization can enable support for a change from an EPS Mobility Management (EMM) idle mode to an EMM connected mode without using a service request procedure.

The CP CIoT EPS optimization and the UP CIoT EPS optimization are further described in 3GPP LTE Technical Specification (TS) 24.301 V14.0.1 Section 5.3.15.

The present technology describes radio access network (RAN) impacts due to CIoT EPS optimizations (e.g., CIoT small data transmissions using the CP CIoT EPS optimization and/or the UP CIoT EPS optimization) as part of a 3GPP Release 13 NB-IoT design, and its backward compatibility with LTE, i.e., non-NB-IoT.

In one example, CIoT EPS optimizations can provide improved support of small data and SMS transfer. A UE supporting CIoT EPS optimizations can request the use of CIoT EPS optimizations during an attach or tracking area updating procedure. The UE can indicate a supported and/or preferred CIoT network behavior. The CIoT EPS optimizations that can be requested by the UE include the control plane CIoT EPS optimization, the user plane CIoT EPS optimization, an SMS transfer without a combined attach procedure, a non-IP packet data network (PDN) type, or a S1-U data transfer. Therefore, the signaling for the CIoT EPS optimizations for NB-IoT UEs can be performed during a NB-IoT session.

In one example, irrespective of whether the UE supports CIoT small data transmissions using the CP CIoT EPS optimization and/or the UP CIoT EPS optimization, a NAS attach message can include 'preferred network behavior' information, which can indicate whether the UE supports and/or prefers: the CP CIoT EPS optimization, the UP CIoT EPS optimization, the SMS without the combined attach, or the S1-u data transfer. The NAS attach message can include a PDN type, and a 'non-IP value can be defined for the PDN type. In addition, the NAS attach message can optionally include a legacy mandatory ESM container. The legacy mandatory ESM container can be optional for CIoT EPS optimization. When the NAS attach message does not include the ESM container, then the UE can perform an attach procedure without establishing a PDN connection.

In one example, when the UE indicates a support of CIoT EPS optimizations in an RRC message or the UE sends the attach request over a NB-IOT radio access technology (RAT), the ESM message container can be omitted.

In another example, the eNodeB can derive an MME address from RRC parameters carrying a globally unique mobility management entity identifier (GUMMEI), an indication of a selected network, and the RAT (e.g., NB-IoT or LTE). In addition, the MME address can be derived based on RRC indications of support for CIoT EPS optimizations. The motivation is that a legacy MME would reject an attach request that does not contain the ESM container, and therefore, the eNodeB can route such an attach request to an appropriate CIoT core network (CN) node, such as an MME support CIoT EPS optimizations or a CIoT serving gateway node (C-SGN). The eNodeB may not route such an attach message to a legacy MME that does not support the CIoT EPS optimizations. On the other hand, since not all networks may support CIoT EPS optimizations, it would be helpful if the NB-IoT UE is also able to distinguish networks that support the CIoT EPS optimizations, e.g., through system information (SI).

In one example, a common RAN solution can be defined for both NB-IoT networks and non-NB-IoT networks. For example, additional optimizations can be defined for both NB-IoT UEs and non-NB-IoT UEs (i.e., LTE UEs).

In one example, in a NB-IoT radio access network (RAN), it can be assumed that the network and UEs that are accessing the network support CIoT EPS optimizations.

In one example, in a non-NB-IoT RAN that supports the CIoT EPS optimizations, the UE can inform the eNodeB on whether a CIoT EPS optimization is supported at the UE instead of a legacy attach mechanism. The UE can convey this information to the eNodeB via a physical random access channel (PRACH) message (msg.1) based on a random access channel (RACH) configuration. Alternatively, the UE can convey this information in an RRC connection request message (msg. 3) or an RRC connection setup complete message (msg.5). For example, the UE can convey this information (i.e., whether the UE supports the CIoT EPS optimizations) using a 'CIoT-used' flag, which can be inserted in one of the PRACH message, the RRC connection request message, or the RRC connection setup complete message. The RRC connection setup complete message can include a non-access stratum (NAS) CIoT attach packet data unit (PDU) along with the 'CIoT-used' flag, since one NAS signaling message or NAS message carrying small data can be piggybacked in the RRC connection setup complete message in an RRC connection establishment procedure.

In one example, an explicit network indication of support of the CIoT EPS optimization, e.g., a 'CIoT-Allowed' flag, can be useful to avoid an unnecessary UE request. The explicit network indication can be sent from the eNodeB to the UE in a, for example, system information block type 1 (SIB1). For example, if this 'CIoT-Allowed' flag is present, the UE may attempt an attach requesting the CIoT EPS optimization and include the 'CIoT-used' flag in the RRC connection setup complete message to an eNodeB that is unable to understand the 'CIoT-used' indication. In this case, the eNodeB can ignore the 'CIoT-used' flag and the attach request can be routed to a legacy MME that may not support the CIoT EPS optimization, in which case, the attach would then be rejected at NAS level e.g., if the ESM container is not included. Therefore, the broadcast indication, e.g., 'CIoT-Allowed' flag, may avoid this issue. In addition, the 'CIoT-Allowed' flag can be defined in the SIB2 within the cell access related parameters to indicate whether a UE access using the CIoT EPS optimization is allowed or not.

FIG. 1 illustrates exemplary signaling between an eNodeB 120 and a user equipment (UE) 110 to indicate that at least one of the eNodeB 120 and the UE 110 supports a cellular Internet of Things (CIoT) optimization. The eNodeB 120 can be part of a radio access network (RAN). The eNodeB 120 and the UE 110 can be configured for narrowband IoT (NB-IoT). As shown in FIG. 1, the eNodeB 120 can send a system information block type 1 (SIB1) (msg.0) to the UE 110, and the SIB1 can include a 'CIoT-Allowed' flag to indicate whether the eNodeB 120 supports the CIoT EPS optimization. Based on the 'CIoT-Allowed' flag included in the SIB1, the UE 110 can determine whether a UE access with the CIoT EPS optimization is allowed or not allowed. The UE 110 can send a physical random access channel (PRACH) message (msg.1) to the eNodeB 120. The eNodeB 120 can send a random access response (RAR) message (msg.2) to the UE 110. The UE 110 can send a radio resource control (RRC) connection request message (msg.3) to the eNodeB 120. The eNodeB 120 can send an RRC connection setup message (msg.4) to the UE 110. The UE 110 can send an RRC connection setup complete message (msg.5) to the eNodeB 120. The RRC connection setup complete message can include a non-access stratum CIoT attach packet data unit (PDU). In addition, the RRC connection setup complete message can include a 'CIoT-used' flag to indicate whether the UE supports the CIoT EPS optimization. After receiving the RRC connection setup complete message with the 'CIoT-used' flag from the UE 110, the eNodeB 120 can identify whether the UE 110 is a low complexity device. Therefore, a NB-IoT design or LTE wideband (WB) design can include the 'CIoT-used' and 'CIoT-Allowed' flags.

In one configuration, with respect to NB-IoT, the UE 110 can send the RRC connection setup complete message (msg.5) to the eNodeB 120. The RRC connection setup complete message can include one or more flags to indicate that one or more Evolved Packet System (EPS) CIoT EPS optimizations are supported at the UE 110. For example, the one or more flags contained in the RRC connection setup message can include a user plane (UP) CIoT Evolved Packet System (EPS) optimization flag (up-CIoT-EPS-Optimisation) that indicates whether the UE 110 is permitted to resume a connection with a UP CIoT EPS optimization. The UP CIoT EPS optimization can enable the UE 110 to support a transition from an EPS Mobility Management (EMM) idle mode to an EMM connected mode without utilizing a service request procedure. In addition, the one or more flags contained in the RRC connection setup message can include an attach without packet data network (PDN) connectivity flag (attachWithoutPDN-Connectivity) that indicates whether attach without PDN connectivity is supported at the UE 110.

In one configuration, with respect to non-NB-IoT (i.e., LTE), the eNodeB 120 can transmit a system information block (SIB), such as a SIB2, to the UE 110. The SIB can include one or more flags to indicate that one or more CIoT EPS optimizations are supported at the eNodeB 120. For example, the SIB can include a control plane (CP) CIoT EPS optimization flag (cp-CIoT-EPS-Optimisation) to indicate that the eNodeB 120 supports a CP CIoT EPS optimization. The CP CIoT EPS optimization can include support of a transport of user data over the CP via a mobility management entity (MME) without triggering a data radio bearer (DRB) establishment. In some cases, if the DRB is established, the CIP CIoT EPS optimization can still be used, e.g., data over NAS can still be sent with or without DRB establishment. The SIB can include a user plane (UP) CIoT EPS optimization flag (up-CIoT-EPS-Optimisation) to indicate that the eNodeB 120 supports a UP CIoT EPS optimization. The UP CIoT EPS optimization can enable the UE 110 to support a transition from an EPS Mobility Management (EMM) idle mode to an EMM connected mode without utilizing a service request procedure. The SIB can include an attach without packet data network (PDN) connectivity flag (attachWithoutPDN-Connectivity) that indicates whether attach without PDN connectivity is supported at the eNodeB 120. The UE 110 can receive the SIB from the eNodeB 120, and based on the flags included in the SIB, the UE 110 can determine a network capability for the CIoT EPS optimizations (i.e., whether the eNodeB 120 supports the CP CIoT EPS optimization, the UP CIoT EPS optimization and/or the attach without PDN connectivity). Furthermore, the UE 110 can send a radio resource control (RRC) connection setup complete message (msg.5) to the eNodeB 120. The RRC connection setup complete message can include one or more flags to indicate that one or more CIoT EPS optimizations are supported at the UE 110. For example, similar to the SIB, the RRC connection setup complete message can include one or more of the CP CIoT EPS optimization flag (cp-CIoT-EPS-Optimisation), the UP CIoT EPS optimization flag (up-CIoT-EPS-Optimisation) or the attach without packet data network (PDN) connectivity flag (attachWithoutPDN-Connectivity) to indicate the CIoT EPS optimizations that are supported at the UE 110.

In one configuration, whether a UE request is attached through a legacy mechanism or a CIoT optimized mechanism can be a NAS decision. However, if the network does not support the CIoT EPS optimization, the AS layer can inform the NAS layer, so that the NAS layer can determine whether to use the legacy mechanism. In addition, the UE can prioritize the selection of cells in which the UE can use the CIoT EPS optimization irrespective of which cell the UE would have selected based on the legacy cell selection mechanism. A similar technique can be applied for the cell reselection mechanism. When the re-selects to a cell in which the UE cannot use the CIoT EPS optimization, the UE may re-attach in order to establish the connection in that cell (e.g., as Release 13 NB-IoT does not address mobility scenarios).

In one configuration, a number of modifications can be made to the non-NB-IoT and NB-IoT RAN to support the CIoT EPS optimization. For example, a new optional broadcast parameter can be defined to indicate the support of CIoT network optimizations in the non-NB-IoT RAN, e.g., a new CIoT-Allowed flag can be defined as part of the cell access related information in a SIB1. In addition, a new CIoT-Used flag can be defined as part of an RRC connection setup complete message (msg.5), and the CIoT-Used flag can indicate the support of CIoT EPS optimizations at the UE. In other words, the presence of the CIoT-Used flag can identify a CIoT optimized attach request from the UE (as opposed to a legacy attach request).

In one example, a potential deployment involves upgrading the MME with only the CP CIoT EPS optimization or only the UP CIoT EPS optimization. As a result, the eNodeB can possess the ability to distinguish between MMEs that support only the CP CIoT EPS optimization or only the UP CIoT EPS optimization In this case, the flag can be defined to distinguish between CIoT EPS optimizations in general, the CP CIoT EPS optimization and the UP CIoT EPS optimization. For example, the flag can be 'CIoT-Allowed' to indicate that CIoT EPS optimizations are allowed in general, the flag can be 'CIoT-CP-Allowed' to indicate that only the CP CIoT EPS optimization is allowed, or the flag can be 'CIoT-UP-Allowed' to indicate that only the UP CIoT EPS optimization is allowed.

In one example, the UE can send a NAS attach request to the eNodeB, and the NAS attach request can include a 'preferred network behavior' parameter that indicates whether the UE supports and/or prefers a CP CIoT EPS optimization or a UP CIoT EPS optimization. Upon receiving the NAS attach request including the "preferred network behavior" parameter from the UE, the eNodeB can indicate to the UE a chosen mechanism as part of a "supported network behavior" parameter included in a NAS attach accept message. This NAS PDU can be encapsulated in an S1 application protocol (S1-AP) initial context setup request, unless the CP EPS optimization is selected, or, the UE did not include the ESM message container in the attach request, in which case an S1-AP downlink NAS transport message can be used.

From the RAN side, when the S1-AP initial context setup request is received, UP bearers can be established. If the UP CIoT EPS optimization has been allowed by the RAN, the eNodeB can receive a specific indication of its allowance, for example, in the initial context setup request. On the other hand, if the CP CIoT EPS optimization has been allowed, the eNodeB may not receive an indication unless a RAN level configuration is to be chosen differently, e.g., an optimized radio link control (RLC) configuration or a specific CIoT signaling radio bearer (SRB) configuration.

In one example, the eNodeB can determine whether the UP bearer is being set up or not depending on the S1-AP response message to the NAS attach request for the CIoT EPS optimization/network. If the eNodeB receives the S1-AP initial context setup request, the eNodeB can initiate the setup of the UP bearer. When the MME allows the usage of the UP CIoT EPS optimization for a specific UE, the MME can include corresponding explicit indication for the eNodeB within the S1-AP initial context setup request message. In addition, when the eNodeB is to apply a specific RAN configuration or behavior for the CP CIoT EPS optimization, an S1 indication from the MME to the eNodeB can be defined when the CP CIoT EPS optimization is allowed for a specific UE.

In one configuration, an RRC connection establishment cause can be used for differentiated handling, e.g., of data and signaling, in AS. The following values of the RRC establishment cause may be applicable for NB-IOT: mt-Access, mo-Signalling, mo-Data, mo-Exception-Data. In legacy LTE systems, the establishment causes of emergency, highPriorityAccess, mt-Access, mo-Signaling, mo-Data, and delayTolerantAccess are defined. In 3GPP Release 13, one of the two spare values can be used with mo-VoiceCall. Non-NB-IoT UEs may want to benefit from this distinction of mobile originated (MO) data for normal or exception reporting. A number of these legacy values may not be applicable for NB-IoT (e.g., emergency, highPriorityAccess, delayTolerantAccess and mo-VoiceCall), at least in the same way as the legacy values are applicable in LTE networks.

FIG. 2 illustrates an exemplary table of establishment causes that are applicable to narrowband Internet of Things (NB-IoT) networks and non-NB IoT networks. In Option A, an establishment cause of delayTolerantAccess can be defined for normal data reporting, and an establishment cause of mo-Data can be defined for exception data reporting. In Option B, an establishment clause of mo-Data can be defined for normal data reporting, and an establishment cause of emergency can be defined for exception data reporting. In Option C, an establishment clause of mo-Data can be defined for normal data reporting, and an establishment cause of highPriority can be defined for exception data reporting. In Option D, an establishment clause of mo-Data can be defined for normal data reporting, and an establishment cause of mo-VoiceCall can be defined for exception data reporting. However, some of these legacy establishment cause values may not have the same implication in NB-IoT as compared to legacy LTE systems. For example, delayTolerantAccess may not be mapped as low priority data by the NAS, and mo-VoiceCall may not refer to voice calls, which are not supported in NB-IoT. In addition, as shown in FIG. 2, the table of establishment causes can include LTE establishment causes that allow a different treatment for mobile originated (MO) exception data without defining a new establishment cause (as done for NB-IoT).

In one configuration, a user equipment (UE) can operate in a 3GPP network in accordance with an MTC or IoT protocol for exchanging data with an eNodeB. The UE can transmit or receive small data using control plane and/or user plane solutions with CIoT EPS optimizations. The UE can identify an eNodeB that supports CIoT EPS optimizations. The UE can transmit an RRC connection setup complete message (msg.5) within an attach procedure. The RRC connection setup complete message can include a new CIoT-Used flag to identify a CIoT optimized attach request, and this indication can be provided from a non-access stratum (NAS) layer to an access stratum (AS) layer.

In one configuration, a network node can exchange data with a user equipment (UE), and the data can be exchanged using control plane and/or user plane solutions with CIoT EPS optimizations. The network node can be an eNodeB. The network node can be classified as a NB-IoT node or a non NB-IoT node. The eNodeB can broadcast a support of CIoT EPS optimizations using a flag (e.g., CIoT-Allowed), and the support of CIoT EPS optimizations can be included in cell access related information in a system information block type 1 (SIB1). The eNodeB can broadcast a support of a specific type of solution (e.g., control plane and/or user plane solution) based on whether a mobility management entity (MME) connected to the eNodeB supports the solution(s). The eNodeB can broadcast specific flags indicating a support provided by the MME (i.e., a support for user plane or control plane solutions).

Figure 3:
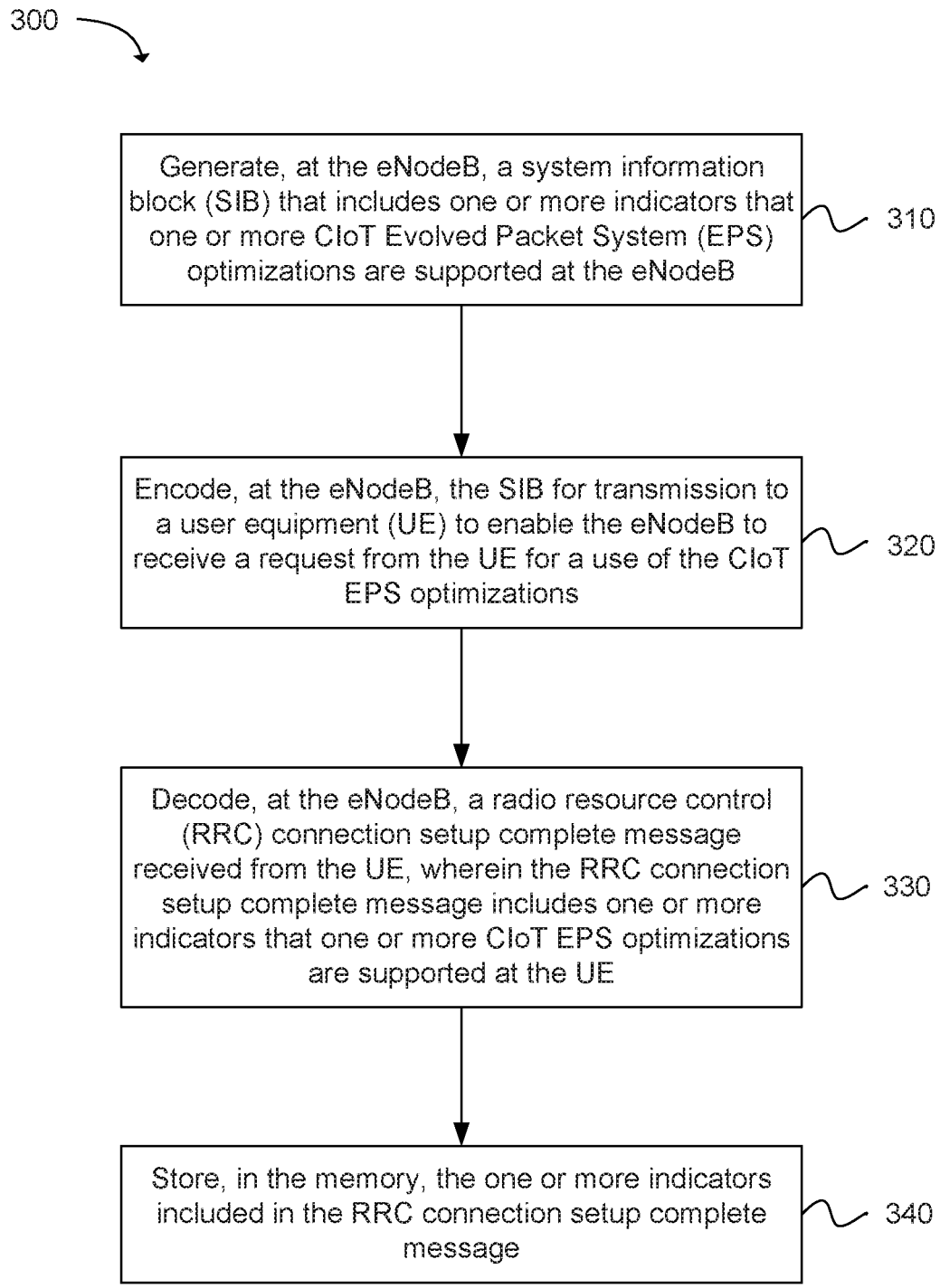
FIG. 3 depicts functionality of an eNodeB operable to support Cellular Internet of Things (CIoT) in accordance with an example.

Another example provides functionality 300 of an eNodeB operable to support Cellular Internet of Things (CIoT), as shown in FIG. 3. The eNodeB can comprise memory. The eNodeB can comprise one or more processors configured to: generate, at the eNodeB, a system information block (SIB) that includes one or more indicators that one or more CIoT Evolved Packet System (EPS) optimizations are supported at the eNodeB, as in block 310. The eNodeB can comprise one or more processors configured to: encode, at the eNodeB, the SIB for transmission to a user equipment (UE) to enable the eNodeB to receive a request from the UE for a use of the CIoT EPS optimizations, as in block 320. The eNodeB can comprise one or more processors configured to: decode, at the eNodeB, a radio resource control (RRC) connection setup complete message received from the UE, wherein the RRC connection setup complete message includes one or more indicators that one or more CIoT EPS optimizations are supported at the UE, as in block 330. The eNodeB can comprise one or more processors configured to: store, in the memory, the one or more indicators included in the RRC connection setup complete message, as in block 340.

Figure 4:
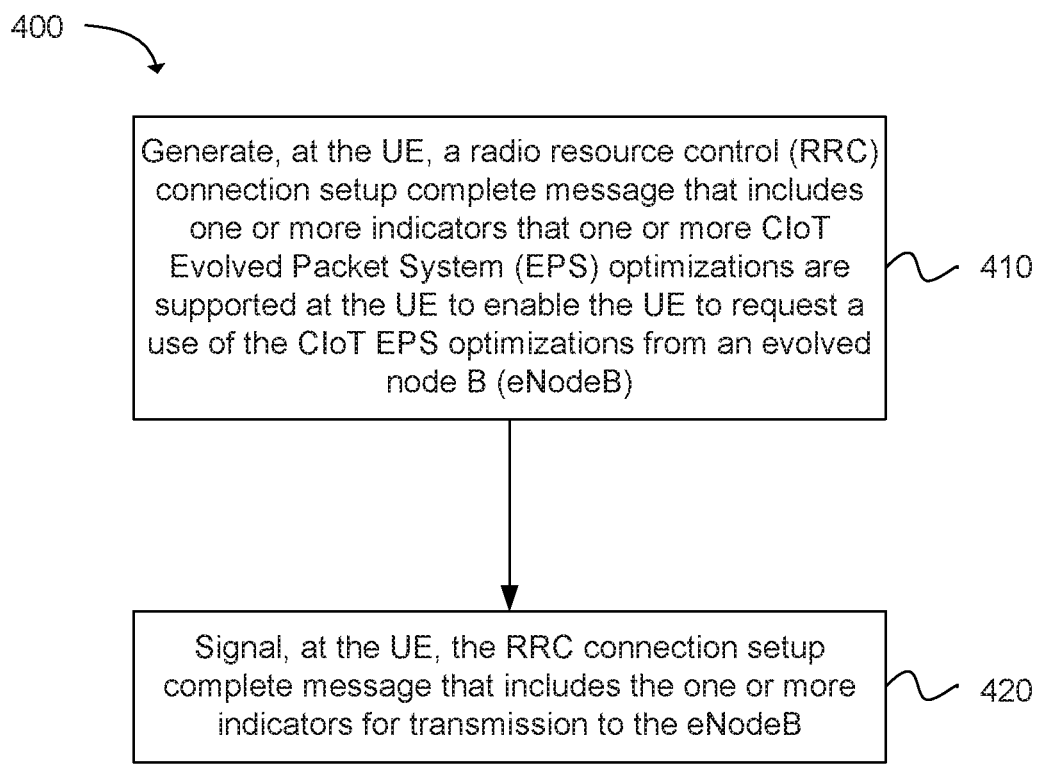
FIG. 4 depicts functionality of a user equipment (UE) operable to support Cellular Internet of Things (CIoT) in accordance with an example.

Another example provides functionality 400 of a user equipment (UE) operable to support Cellular Internet of Things (CIoT), as shown in FIG. 4. The UE can comprise memory. The UE can comprise one or more processors configured to: generate, at the UE, a radio resource control (RRC) connection setup complete message that includes one or more indicators that one or more CIoT Evolved Packet System (EPS) optimizations are supported at the UE to enable the UE to request a use of the CIoT EPS optimizations from an evolved NodeB (eNodeB), as in block 410. The UE can comprise one or more processors configured to: signal, at the UE, the RRC connection setup complete message that includes the one or more indicators for transmission to the eNodeB, as in block 420.

Figure 5:
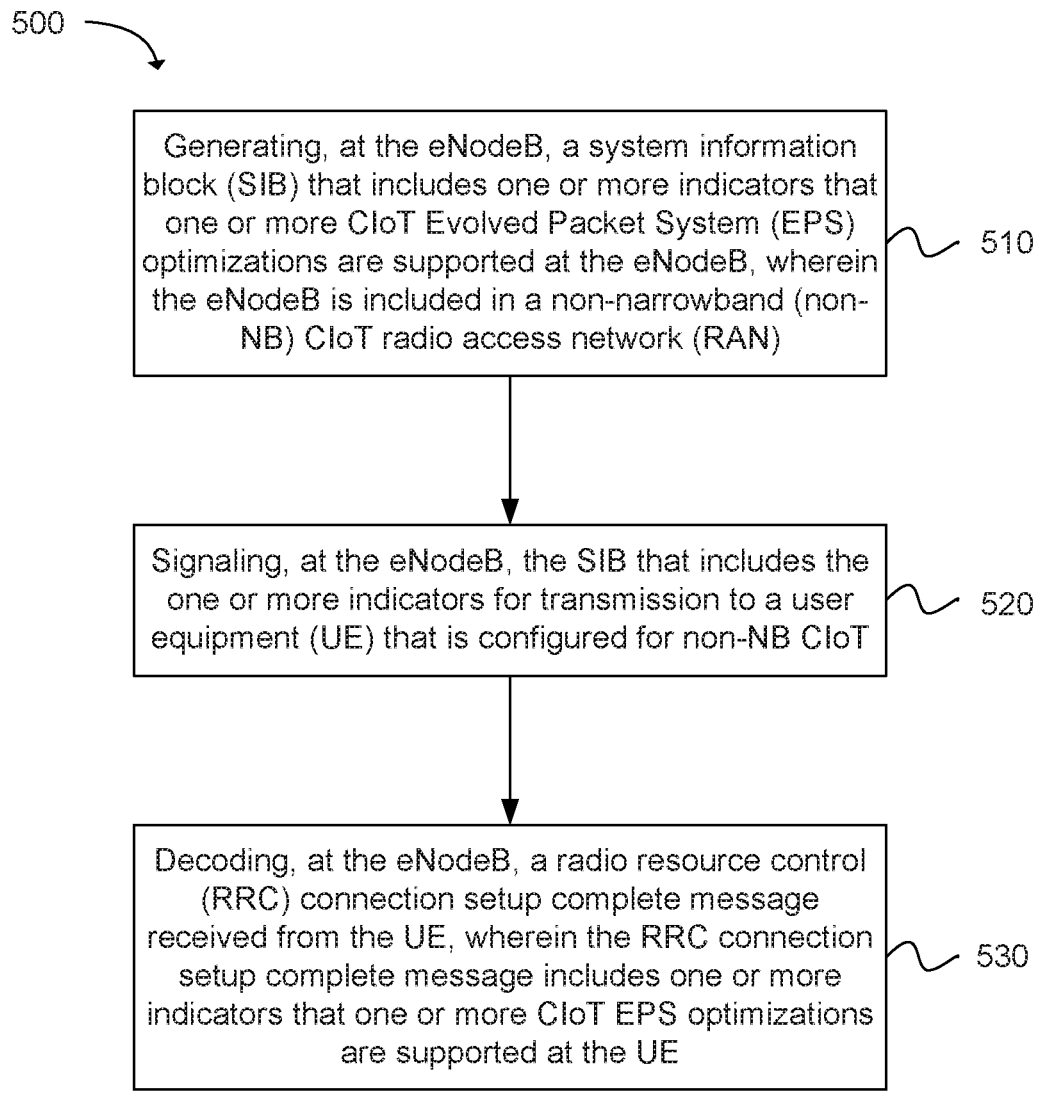
FIG. 5 depicts a flowchart of a machine readable storage medium having instructions embodied thereon for supporting Cellular Internet of Things (CIoT) at an eNodeB in accordance with an example.

Another example provides at least one machine readable storage medium having instructions 500 embodied thereon for supporting Cellular Internet of Things (CIoT) at an eNodeB, as shown in FIG. 5. The instructions can be executed on a machine, where the instructions are included on at least one computer readable medium or one non-transitory machine readable storage medium. The instructions when executed perform: generating, at the eNodeB, a system information block (SIB) that includes one or more indicators that one or more CIoT Evolved Packet System (EPS) optimizations are supported at the eNodeB, wherein the eNodeB is included in a non-narrowband (non-NB) CIoT radio access network (RAN), as in block 510. The instructions when executed perform: signaling, at the eNodeB, the SIB that includes the one or more indicators for transmission to a user equipment (UE) that is configured for non-NB CIoT, as in block 520. The instructions when executed perform: decoding, at the eNodeB, a radio resource control (RRC) connection setup complete message received from the UE, wherein the RRC connection setup complete message includes one or more indicators that one or more CIoT EPS optimizations are supported at the UE, as in block 530.

Figure 6:
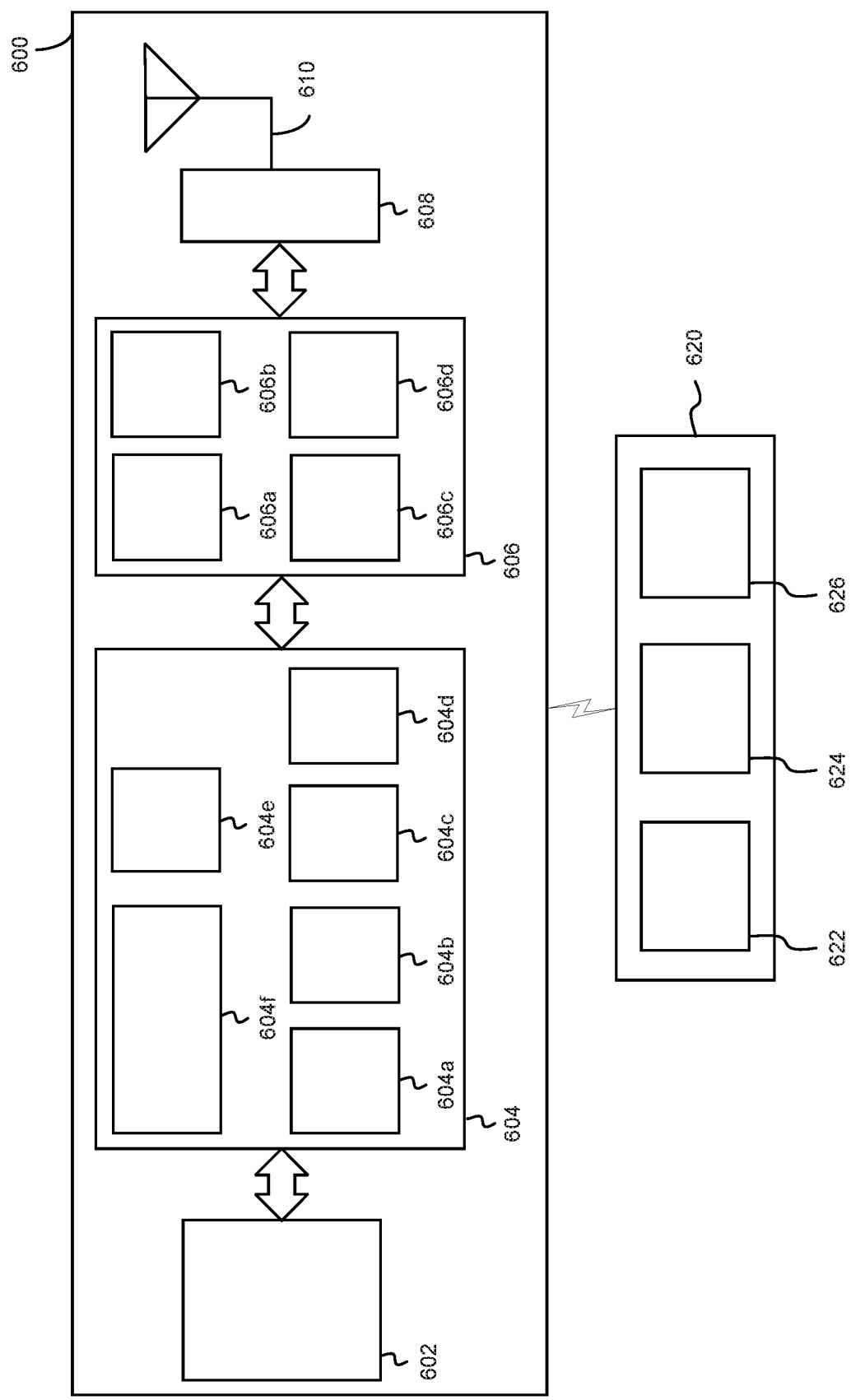
FIG. 6 illustrates a diagram of a wireless device (e.g., UE) and a base station (e.g., eNodeB) in accordance with an example.

FIG. 6 provides an example illustration of a user equipment (UE) device 600 and a node 620. The UE device 600 can include a wireless device, a mobile station (MS), a mobile wireless device, a mobile communication device, a tablet, a handset, or other type of wireless device. The UE device 600 can include one or more antennas configured to communicate with the node 620 or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The node 620 can include one or more processors 622, memory 624 and a transceiver 626. The UE device 600 can be configured to communicate using at least one wireless communication standard including 3GPP LTE, WiMAX, High Speed Packet Access (HSPA), Bluetooth, and WiFi. The UE device 600 can communicate using separate antennas for each wireless communication standard or shared antennas for multiple wireless communication standards. The UE device 600 can communicate in a wireless local area network (WLAN), a wireless personal area network (WPAN), and/or a WWAN.

In some embodiments, the UE device 600 may include application circuitry 602, baseband circuitry 604, Radio Frequency (RF) circuitry 606, front-end module (FEM) circuitry 608 and one or more antennas 610, coupled together at least as shown. In addition, the node 620 may include, similar to that described for the UE device 600, application circuitry, baseband circuitry, Radio Frequency (RF) circuitry, front-end module (FEM) circuitry and one or more antennas The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium, and may be configured to execute instructions stored in the storage medium to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuity 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

The RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a necessity. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature down-conversion and/or up-conversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct down-conversion and/or direct up-conversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a necessity. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610.

Figure 7:
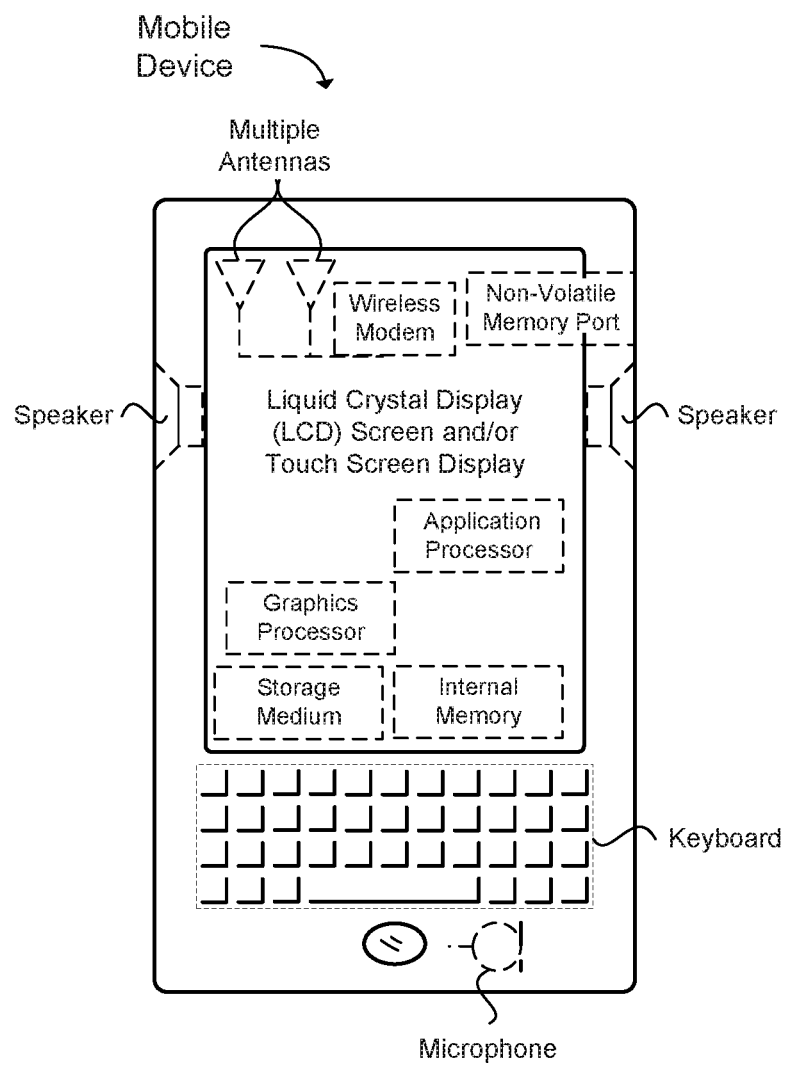
FIG. 7 illustrates a diagram of a wireless device (e.g., UE) in accordance with an example.

FIG. 7 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 7 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of an eNodeB operable to support Cellular Internet of Things (CIoT), the apparatus comprising memory; and one or more processors configured to: generate, at the eNodeB, a system information block (SIB) that includes one or more indicators that one or more CIoT Evolved Packet System (EPS) optimizations are supported at the eNodeB; encode, at the eNodeB, the SIB for transmission to a user equipment (UE) to enable the eNodeB to receive a request from the UE for a use of the CIoT EPS optimizations; decode, at the eNodeB, a radio resource control (RRC) connection setup complete message received from the UE, wherein the RRC connection setup complete message includes one or more indicators that one or more CIoT EPS optimizations are supported at the UE; and store, in the memory, the one or more indicators included in the RRC connection setup complete message.

Example 2 includes the apparatus of Example 1, further comprising a transceiver configured to: transmit, to the UE, the SIB that contains the one or more to the UE; and receive, from the UE, the RRC connection setup complete message that includes the one or more indicators.

Example 3 includes the apparatus of any of Examples 1 to 2, wherein: the one or more indicators in the SIB include a control plane (CP) CIoT EPS optimization indicator on whether the UE is allowed to establish a connection with a CP CIoT EPS optimization; or the one or more indicators in the RRC connection setup complete message include a CP CIoT EPS optimization indicator that denotes support at the UE for the CP CIoT EPS optimization.

Example 4 includes the apparatus of any of Examples 1 to 3, wherein the CP CIoT EPS optimization enables support of a transport of user data over the CP via a mobility management entity (MME) without triggering a data radio bearer (DRB) establishment.

Example 5 includes the apparatus of any of Examples 1 to 4, wherein: the one or more indicators in the SIB include a user plane (UP) CIoT EPS optimization indicator on whether the UE is allowed to resume a connection with a UP CIoT EPS optimization; or the one or more indicators in the RRC connection setup complete message include a UP CIoT EPS optimization indicator that denotes support at the UE for the UP CIoT EPS optimization.

Example 6 includes the apparatus of any of Examples 1 to 5, wherein the UP CIoT EPS optimization enables a transition from an EPS Mobility Management (EMM) idle mode to an EMM connected mode at the UE without utilizing a service request procedure.

Example 7 includes the apparatus of any of Examples 1 to 6, wherein: the one or more indicators in the SIB include an attach without packet data network (PDN) connectivity indicator that denotes support at the eNodeB for attach without PDN connectivity; or the one or more indicators in the RRC connection setup complete message include an attach without PDN connectivity indicator that the UE performs attach without PDN connectivity.

Example 8 includes an apparatus of a user equipment (UE) operable to support Cellular Internet of Things (CIoT), the apparatus comprising memory; and one or more processors configured to: generate, at the UE, a radio resource control (RRC) connection setup complete message that includes one or more indicators that one or more CIoT Evolved Packet System (EPS) optimizations are supported at the UE to enable the UE to request a use of the CIoT EPS optimizations from an evolved NodeB (eNodeB); and signal, at the UE, the RRC connection setup complete message that includes the one or more indicators for transmission to the eNodeB.

Example 9 includes the apparatus of Example 8, further comprising a transceiver configured to send the RRC connection setup complete message to the eNodeB.

Example 10 includes the apparatus of any of Examples 8 to 9, further comprising the memory configured to store the one or more indicators that one or more CIoT EPS optimizations are supported at the UE.

Example 11 includes the apparatus of any of Examples 8 to 10, wherein the one or more processors are further configured to: decode, at the UE, a system information block (SIB) received from the eNodeB, wherein the SIB includes one or more indicators that one or more CIoT EPS optimizations are supported at the eNodeB.

Example 12 includes the apparatus of any of Examples 8 to 11, wherein the one or more indicators in the RRC connection setup complete message include a UP CIoT EPS optimization indicator that denotes support at the UE for the UP CIoT EPS optimization.

Example 13 includes the apparatus of any of Examples 8 to 12, wherein the UP CIoT EPS optimization enables the UE to support a transition from an EPS Mobility Management (EMM) idle mode to an EMM connected mode without utilizing a service request procedure.

Example 14 includes the apparatus of any of Examples 8 to 13, wherein the one or more indicators in the RRC connection setup complete message include an attach without PDN connectivity indicator that the UE performs attach without PDN connectivity.

Example 15 includes the apparatus of any of Examples 8 to 14, wherein the UE is configured for narrowband (NB) CIoT.

Example 16 includes at least one machine readable storage medium having instructions embodied thereon for supporting Cellular Internet of Things (CIoT) at an eNodeB, the instructions when executed by one or more processors at the eNodeB perform the following: generating, at the eNodeB, a system information block (SIB) that includes one or more indicators that one or more CIoT Evolved Packet System (EPS) optimizations are supported at the eNodeB, wherein the eNodeB is included in a non-narrowband (non-NB) CIoT radio access network (RAN); signaling, at the eNodeB, the SIB that includes the one or more indicators for transmission to a user equipment (UE) that is configured for non-NB CIoT; and decoding, at the eNodeB, a radio resource control (RRC) connection setup complete message received from the UE, wherein the RRC connection setup complete message includes one or more indicators that one or more CIoT EPS optimizations are supported at the UE.

Example 17 includes the at least one machine readable storage medium of Example 16, wherein: the one or more indicators in the SIB include a control plane (CP) CIoT EPS optimization indicator on whether the UE is allowed to establish a connection with a CP CIoT EPS optimization; or the one or more indicators in the RRC connection setup complete message include a CP CIoT EPS optimization indicator that denotes support at the UE for the CP CIoT EPS optimization.

Example 18 includes the at least one machine readable storage medium of any of Examples 16 to 17, wherein the CP CIoT EPS optimization enables support of a transport of user data over the CP via a mobility management entity (MME) without triggering a data radio bearer (DRB) establishment.

Example 19 includes the at least one machine readable storage medium of any of Examples 16 to 18, wherein: the one or more indicators in the SIB include a user plane (UP) CIoT EPS optimization indicator on whether the UE is allowed to resume a connection with a UP CIoT EPS optimization; or the one or more indicators in the RRC connection setup complete message include a UP CIoT EPS optimization indicator that denotes support at the UE for the UP CIoT EPS optimization Example 20 includes the at least one machine readable storage medium of any of Examples 16 to 19, wherein the UP CIoT EPS optimization enables a transition from an EPS Mobility Management (EMM) idle mode to an EMM connected mode at the UE without utilizing a service request procedure.

Example 21 includes the at least one machine readable storage medium of any of Examples 16 to 20, wherein: the one or more indicators in the SIB include an attach without packet data network (PDN) connectivity indicator that denotes support at the eNodeB for attach without PDN connectivity; or the one or more indicators in the RRC connection setup complete message include an attach without PDN connectivity indicator that the UE performs attach without PDN connectivity.

Example 22 includes an eNodeB operable to support Cellular Internet of Things (CIoT), the eNodeB comprising: means for generating a system information block (SIB) that includes one or more indicators that one or more CIoT Evolved Packet System (EPS) optimizations are supported at the eNodeB, wherein the eNodeB is included in a non-narrowband (non-NB) CIoT radio access network (RAN); means for signaling the SIB that includes the one or more indicators for transmission to a user equipment (UE) that is configured for non-NB CIoT; and means for decoding a radio resource control (RRC) connection setup complete message received from the UE, wherein the RRC connection setup complete message includes one or more indicators that one or more CIoT EPS optimizations are supported at the UE.

Example 23 includes the eNodeB of Example 22, wherein: the one or more indicators in the SIB include a control plane (CP) CIoT EPS optimization indicator on whether the UE is allowed to establish a connection with a CP CIoT EPS optimization; or the one or more indicators in the RRC connection setup complete message include a CP CIoT EPS optimization indicator that denotes support at the UE for the CP CIoT EPS optimization.

Example 24 includes the eNodeB of any of Examples 22 to 23, wherein the CP CIoT EPS optimization enables support of a transport of user data over the CP via a mobility management entity (MME) without triggering a data radio bearer (DRB) establishment.

Example 25 includes the eNodeB of any of Examples 22 to 24, wherein: the one or more indicators in the SIB include a user plane (UP) CIoT EPS optimization indicator on whether the UE is allowed to resume a connection with a UP CIoT EPS optimization; or the one or more indicators in the RRC connection setup complete message include a UP CIoT EPS optimization indicator that denotes support at the UE for the UP CIoT EPS optimization Example 26 includes the eNodeB of any of Examples 22 to 25, wherein the UP CIoT EPS optimization enables a transition from an EPS Mobility Management (EMM) idle mode to an EMM connected mode at the UE without utilizing a service request procedure.

Example 27 includes the eNodeB of any of Examples 22 to 26, wherein: the one or more indicators in the SIB include an attach without packet data network (PDN) connectivity indicator that denotes support at the eNodeB for attach without PDN connectivity; or the one or more indicators in the RRC connection setup complete message include an attach without PDN connectivity indicator that the UE performs attach without PDN connectivity.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of an eNodeB operable to support Cellular Internet of Things (CIoT), the apparatus comprising memory; and one or more processors configured to:
generate, at the eNodeB, a system information block (SIB) that includes one or more indicators that one or more CIoT Evolved Packet System (EPS) optimizations are supported at the eNodeB, wherein the one or more indicators in the SIB include a user plane (UP) CIoT EPS optimization indicator on whether the UE is allowed to resume a connection with a UP CIoT EPS optimization, and wherein the UP CIoT EPS optimization enables a transition from an EPS Mobility Management (EMM) idle mode to an EMM connected mode at the UE without utilizing a service request procedure;
encode, at the eNodeB, the SIB for transmission to a user equipment (UE) to enable the eNodeB to receive a request from the UE for a use of the CIoT EPS optimizations;
decode, at the eNodeB, a radio resource control (RRC) connection setup complete message received from the UE, wherein the RRC connection setup complete message includes one or more indicators that one or more CIoT EPS optimizations are supported at the UE; and
store, in the memory, the one or more indicators included in the RRC connection setup complete message.

2. The apparatus of claim 1, further comprising a transceiver configured to:
transmit, to the UE, the SIB that contains the one or more indicators to the UE; and receive, from the UE, the RRC connection setup complete message that includes the one or more indicators.

3. The apparatus of claim 1, wherein:
the one or more indicators in the SIB include a control plane (CP) CIoT EPS optimization indicator on whether the UE is allowed to establish a connection with a CP CIoT EPS optimization; or
the one or more indicators in the RRC connection setup complete message include a CP CIoT EPS optimization indicator that denotes support at the UE for the CP CIoT EPS optimization.

4. The apparatus of claim 3, wherein the CP CIoT EPS optimization enables support of a transport of user data over the CP via a mobility management entity (MME) without triggering a data radio bearer (DRB) establishment.

5. The apparatus of claim 1, wherein:
the one or more indicators in the RRC connection setup complete message include a UP CIoT EPS optimization indicator that denotes support at the UE for the UP CIoT EPS optimization.

6. The apparatus of claim 1, wherein:
the one or more indicators in the SIB include an attach without packet data network (PDN) connectivity indicator that denotes support at the eNodeB for attach without PDN connectivity; or
the one or more indicators in the RRC connection setup complete message include an attach without PDN connectivity indicator that the UE performs attach without PDN connectivity.

7. An apparatus of a user equipment (UE) operable to support Cellular Internet of Things (CIoT), the apparatus comprising memory; and one or more processors configured to:
generate, at the UE, a radio resource control (RRC) connection setup complete message that includes one or more indicators that one or more CIoT Evolved Packet System (EPS) optimizations are supported at the UE to enable the UE to request a use of the CIoT EPS optimizations from an evolved NodeB (eNodeB); and
signal, at the UE, the RRC connection setup complete message that includes the one or more indicators for transmission to the eNodeB, wherein the one or more indicators in the RRC connection setup complete message include an attach without packet data network (PDN) connectivity indicator to indicate that the UE performs attach without PDN connectivity.

8. The apparatus of claim 7, further comprising a transceiver configured to send the RRC connection setup complete message to the eNodeB.

9. The apparatus of claim 7, further comprising the memory configured to store the one or more indicators that one or more CIoT EPS optimizations are supported at the UE.

10. The apparatus of claim 7, wherein the one or more processors are further configured to: decode, at the UE, a system information block (SIB) received from the eNodeB, wherein the SIB includes one or more indicators that one or more CIoT EPS optimizations are supported at the eNodeB.

11. The apparatus of claim 7, wherein the one or more indicators in the RRC connection setup complete message include a user plane (UP) CIoT EPS optimization indicator that denotes support at the UE for the UP CIoT EPS optimization.

12. The apparatus of claim 11, wherein the UP CIoT EPS optimization enables the UE to support a transition from an EPS Mobility Management (EMM) idle mode to an EMM connected mode without utilizing a service request procedure.

13. The apparatus of claim 7, wherein the UE is configured for narrowband (NB) CIoT.

14. At least one non-transitory machine readable storage medium having instructions embodied thereon for supporting Cellular Internet of Things (CIoT) at an eNodeB, the instructions when executed by one or more processors at the eNodeB perform the following:
generating, at the eNodeB, a system information block (SIB) that includes one or more indicators that one or more CIoT Evolved Packet System (EPS) optimizations are supported at the eNodeB, wherein the eNodeB is included in a non-narrowband (non-NB) CIoT radio access network (RAN), wherein the one or more indicators in the SIB include an attach without packet data network (PDN) connectivity indicator that denotes support at the eNodeB for attach without PDN connectivity, or wherein the one or more indicators in the RRC connection setup complete message include an attach without PDN connectivity indicator that the UE performs attach without PDN connectivity;
signaling, at the eNodeB, the SIB that includes the one or more indicators for transmission to a user equipment (UE) that is configured for non-NB CIoT; and
decoding, at the eNodeB, a radio resource control (RRC) connection setup complete message received from the UE, wherein the RRC connection setup complete message includes one or more indicators that one or more CIoT EPS optimizations are supported at the UE.

15. The at least one non-transitory machine readable storage medium of claim 14, wherein:
the one or more indicators in the SIB include a control plane (CP) CIoT EPS optimization indicator on whether the UE is allowed to establish a connection with a CP CIoT EPS optimization; or
the one or more indicators in the RRC connection setup complete message include a CP CIoT EPS optimization indicator that denotes support at the UE for the CP CIoT EPS optimization.

16. The at least one non-transitory machine readable storage medium of claim 15, wherein the CP CIoT EPS optimization enables support of a transport of user data over the CP via a mobility management entity (MME) without triggering a data radio bearer (DRB) establishment.

17. The at least one non-transitory machine readable storage medium of claim 14, wherein:
the one or more indicators in the SIB include a user plane (UP) CIoT EPS optimization indicator on whether the UE is allowed to resume a connection with a UP CIoT EPS optimization; or
the one or more indicators in the RRC connection setup complete message include a UP CIoT EPS optimization indicator that denotes support at the UE for the UP CIoT EPS optimization.

18. The at least one non-transitory machine readable storage medium of claim 17, wherein the UP CIoT EPS optimization enables a transition from an EPS Mobility Management (EMM) idle mode to an EMM connected mode at the UE without utilizing a service request procedure.

19. An apparatus of a user equipment (UE) operable to support Cellular Internet of Things (CIoT), the apparatus comprising memory; and one or more processors configured to:
generate, at the UE, a radio resource control (RRC) connection setup complete message that includes one or more indicators that one or more CIoT Evolved Packet System (EPS) optimizations are supported at the UE to enable the UE to request a use of the CIoT EPS optimizations from an evolved NodeB (eNodeB), wherein the one or more indicators in the RRC connection setup complete message include a user plane (UP) CIoT EPS optimization indicator that denotes support at the UE for the UP CIoT EPS optimization, and wherein the UP CIoT EPS optimization enables the UE to support a transition from an EPS Mobility Management (EMM) idle mode to an EMM connected mode without utilizing a service request procedure; and signal, at the UE, the RRC connection setup complete message that includes the one or more indicators for transmission to the eNodeB.

20. The apparatus of claim 19, further comprising the memory configured to store the one or more indicators that one or more CIoT EPS optimizations are supported at the UE.

21. The apparatus of claim 19, wherein the one or more processors are further configured to: decode, at the UE, a system information block (SIB) received from the eNodeB, wherein the SIB includes one or more indicators that one or more CIoT EPS optimizations are supported at the eNodeB.

\* \* \* \* \*